(12) United States Patent
Asao et al.

(10) Patent No.: US 6,504,283 B1
(45) Date of Patent: Jan. 7, 2003

(54) ALTERNATOR

(75) Inventors: Yoshihito Asao, Tokyo (JP); Masahiko Fujita, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/661,089

(22) Filed: Sep. 13, 2000

(30) Foreign Application Priority Data

Jan. 12, 2000 (JP) .................................. 2000-003621

(51) Int. Cl.⁷ .............................. H02K 1/12; H02K 3/12
(52) U.S. Cl. ....................... 310/254; 310/179; 310/180; 310/184; 310/201
(58) Field of Search ............................. 310/254, 179, 310/263, 180, 184, 201

(56) References Cited

U.S. PATENT DOCUMENTS

| | | | |
|---|---|---|---|
| 3,453,468 A | 7/1969 | Lund | 310/180 |
| 4,594,523 A | 6/1986 | Horita et al. | 310/142 |
| 4,833,356 A | 5/1989 | Bansal et al. | 310/207 |
| 5,122,705 A * | 6/1992 | Kusase et al. | 310/68 D |
| 5,231,324 A | 7/1993 | Kawamura et al. | 310/198 |
| 5,536,987 A | 7/1996 | Hayashi et al. | 310/263 |
| 5,654,602 A | 8/1997 | Willyoung | 310/179 |
| 5,898,251 A | 4/1999 | Mochizuki et al. | 310/179 |
| 5,936,326 A * | 8/1999 | Umeda et al. | 310/179 |
| 5,955,810 A * | 9/1999 | Umeda et al. | 310/208 |
| 5,982,068 A | 11/1999 | Umeda et al. | 310/206 |
| 5,998,903 A | 12/1999 | Umeda et al. | 310/179 |
| 6,137,201 A | 10/2000 | Umeda et al. | 310/179 |
| 6,140,735 A | 10/2000 | Kato et al. | 310/201 |
| 6,166,471 A * | 12/2000 | Kometani et al. | 310/198 |
| 6,198,190 B1 | 3/2001 | Umeda et al. | 310/179 |
| 6,201,332 B1 | 3/2001 | Umeda et al. | 310/184 |

FOREIGN PATENT DOCUMENTS

| | | | |
|---|---|---|---|
| DE | 19652796 | 6/1998 | |
| DE | 199 22 794 A1 | 5/1999 | ............ H02K/3/12 |
| EP | 0881752 A | 12/1998 | |
| JP | 127167 | 11/1938 | |
| JP | 47-29361 | 9/1972 | |
| JP | 58 116031 A | 7/1983 | |
| JP | 58-116031 | 7/1983 | ............ H02K/1/06 |
| JP | 61 221559 | 10/1986 | |
| JP | 4-26345 | 1/1992 | .......... H02K/19/22 |
| JP | 5-95644 | 4/1993 | |
| JP | 07163074 | 6/1995 | |
| JP | 10-14149 | 1/1998 | |
| JP | 11-98788 | 4/1999 | |
| JP | 11-155270 | 6/1999 | .......... H02K/19/22 |
| JP | 11-164500 | 6/1999 | |
| JP | 11-164505 | 6/1999 | |
| JP | 11-164506 | 6/1999 | |
| WO | WO 92 06527 | 4/1992 | |

* cited by examiner

Primary Examiner—Burton S. Mullins
(74) Attorney, Agent, or Firm—Sughrue Mion, PLLC

(57) ABSTRACT

An alternator includes a stator having an annular stator core provided with a number of slots extending axially disposed in lines circumferentially so as to open on an inner circumferential side and a stator coil wound into the stator core so as to be installed in the slots, a rotor having a number of claw-shaped magnetic poles for alternately forming north-seeking (N) and south-seeking (S) poles about a rotational circumference, the rotor being rotatably disposed on the inner circumferential side of the stator core, a bracket supporting the rotor and the stator, and a rectifier disposed at a first axial end of the stator and connected to end portions of the stator coil, the rectifier converting alternating current from the stator coil into direct current, wherein a number of slots is two per phase per pole, and the stator coil comprises a number of winding sub-portions in each of which a long strand of wire is wound so as to alternately occupy an inner layer and an outer layer in a slot depth direction within the slots at intervals of a predetermined number of slots by folding back the strand of wire outside the slots at axial end surfaces of the stator core.

16 Claims, 17 Drawing Sheets

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 18 is a side elevation showing part of a stator of a conventional automotive alternator such as described in Japanese Patent No. 2927288, for example, FIG. 19 is a perspective showing a conductor segment used in the stator of the conventional automotive alternator shown in FIG. 18, and FIGS. 20 and 21 are perspectives from a front end and a rear end, respectively, of part of the stator of the conventional automotive alternator shown in FIG. 18.

In FIGS. 18 to 21, the stator 50 includes: a stator core 51; a stator coil 52 wound into the stator core 51; and insulators 53 mounted inside slots 51a, the insulators 53 insulating the stator coil 52 from the stator core 51. The stator core 51 is a cylindrical laminated core laminated by stacking thin steel plates, and has a number of slots 51a extending axially disposed at even pitch circumferentially so as to be open on an inner circumferential side. The stator coil 52 is constructed by joining a number of short conductor segments 54 in two three-phase coils. In this case, ninety-six slots 51a are formed so as to house two three-phase coils such that the number of slots housing each phase of the winding portions corresponds to the number of magnetic poles (sixteen) in a rotor (not shown). The two three-phase coils have a mutual phase difference of 30° (electrical angle).

The conductor segments 54 are formed into a general U shape from an insulated copper wire material having a rectangular cross section, and are inserted two at a time from an axial rear end into pairs of slots 51a six slots apart (a pitch of one magnetic pole). Then, end portions of the conductor segments 54 extending outwards at a front end are joined to each other to constitute the stator coil 52.

More specifically, in pairs of slots 15a six slots apart, first conductor segments 54 are inserted from the rear end into first positions from an outer circumferential side within first slots 51a and into second positions from the outer circumferential side within second slots 51a, and second conductor segments 54 are inserted from the rear end into third positions from the outer circumferential side within the first slots 51a and into fourth positions from the outer circumferential side within the second slots 51a. Thus, within each slot 15a, four straight portions 54a of the conductor segments 54 are arranged to line up in a row in a radial direction.

Then, end portions 54b of the conductor segments 54 extending outwards at the front end from the first positions from the outer circumferential side within the first slots 51a and end portions 54b of the conductor segments 54 extending outwards at the front end from the second positions from the outer circumferential side within the second slots 51a six slots away in a clockwise direction from the first slots 51a are joined to form an outer layer winding having two turns. In addition, end portions 54b of the conductor segments 54 extending outwards at the front end from the third positions from the outer circumferential side within the first slots 51a and end portions 54b of the conductor segments 54 extending outwards at the front end from the fourth positions from the outer circumferential side within the second slots 51a six slots away in a clockwise direction from the first slots 51a are joined to form an inner layer winding having two turns.

In addition, the inner layer winding and outer layer winding constituted by the conductor segments 54 inserted into the pairs of slots 51a six slots apart are connected in series to form one coil phase having four turns.

A total of six coil phases each having four turns are formed in this manner. The two three-phase coils constituting the stator coil 52 are formed by connecting three coil phases each into alternating-current connections.

In the conventional stator 50 constructed in this manner, at the rear end of the stator core 51, turn portions 54c of the pairs of conductor segments 54 inserted into the same pairs of slots 15a are lined up in rows in a radial direction. As a result, the turn portions 54c are arranged in two rows circumferentially to constitute a rear-end coil end group.

At the front end of the stator core 51, on the other hand, joint portions formed by joining the end portions 54b of the conductor segments 54 extending outwards at the front end from the first positions from the outer circumferential side within the first slots 51a and the end portions 54b of the conductor segments 54 extending outwards at the front end from the second positions from the outer circumferential side within the second slots 51a six slots away, and joint portions formed by joining the end portions 54b of the conductor segments 54 extending outwards at the front end from the third positions from the outer circumferential side within the first slots 51a and the end portions 54b of the conductor segments 54 extending outwards at the front end from the fourth positions from the outer circumferential side within the second slots 51a six slots away are arranged to line up radially. As a result, joint portions formed by joining end portions 54b to each other are arranged in two rows circumferentially to constitute a front-end coil end group.

In the stator 50 of the conventional automotive alternator, as explained above, the stator coil 52 is constructed by inserting short conductor segments 54 formed in the general U shape into the slots 51a of the stator core 51 from the rear end, and joining end portions 54b of the conductor segments 54 extending outwards at the front end. The end portions 54b of the conductor segments 54 are joined to each other by clamping a portion thereof in a jig, and soldering or welding the tips thereof.

Now, the coil end leakage reactance due to leakage of the magnetic flux passing through the coil ends is proportionate to the height of the coil ends. In the conventional stator coil 52, because clamping area is required for the jig, making the coil ends high, there has been a problem of increased coil end leakage reactance, causing output to deteriorate.

Furthermore, if the number of claw-shaped magnetic poles and the number of slots are increased, the coils in the coil ends are closer together, and when the joining portions of the conductor segments expand, because the space between the coils in the coil ends become excessively narrow and the height of the coil ends is increased, there is mutual interference between the coils in the coil ends, and there has been a problem of deterioration in output.

Furthermore, in the conventional stator 50, a large number of the short conductor segments 54 must be inserted into the stator core 51 and their end portions 54b must be joined by welding, soldering, etc., which has led to a problem of significantly decreased operability. In addition, when joining the end portions 54b, there has also been a problem of short circuiting often occurring between the joint portions due to spilt solder or weld melt, significantly decreasing mass-productivity.

Furthermore, in the conventional stator construction which uses conductor segments 54, because buckling, etc., occurs more frequently during insertion of the conductor segments 54 into the slots as the number of slots increases, it has been difficult to apply this construction to an alternator aiming for compactness and high output by increasing the number of claw-shaped magnetic poles and the number of slots.

Furthermore, there has been a problem of decreased reliability of the conventional stator 50 constructed in this manner because of the problems explained below.

First, because the front-end coil end groups are constructed such that the joint portions between the end portions 54b where the insulation coating has been lost due to welding and soldering are arranged in rows in a circumferential direction, the coil-end construction becomes susceptible to corrosion through exposure to moisture and the ability to withstand corrosion is extremely low.

Furthermore, because the coil ends are constructed from ninety-six joining portions in two rows, that is from 192 joining portions, the construction is susceptible to short circuiting, and short-circuiting accidents happen easily.

In addition, because the amount of the conductor segments 54 which must be pushed through the slots 51a must be greater than the axial length of the stator core 51, the insulation coating of the conductor segments 54 is easily damaged.

Furthermore, the conventional stator 50 aims to reduce magnetic noise by mutually canceling out magnetic pulation forces by winding into the slots two three-phase coils which are offset in positions having an electrical phase difference of 30. However, in this construction, although the fifth and seventh magnetomotive harmonic frequencies of the stator can be reduced, one problem has been that the eleventh and thirteenth magnetomotive harmonic frequencies of the stator, which occupy a large ratio among the magnetic flux pulsation which arise in the alternator, are increased, decreasing the effective reduction in magnetic noise. In addition, because the end portions 54b of the conductor segments 54 are welded together, softening occurs in the conductor segments 54 due to the rise in temperature during welding, reducing the rigidity of the stator and decreasing the effective reduction in magnetic noise.

Furthermore, if the number of claw-shaped magnetic poles and the number of slots are increased in order to achieve compactness and high output, pulsation in magnetic flux occurring between the teeth and the claw-shaped magnetic poles increase, and at the same time because the rigidity of the stator is decreased by the reduction in the width of the teeth, magnetic noise tends to be promoted. Consequently, with the magnetic counter-measures in which two three-phase coils are wound into the slots such that their positions are offset by an electrical phase difference of 30°, another problem has been that it is not possible to sufficiently reduce magnetic noise in an alternator achieving compactness and high output.

SUMMARY OF THE INVENTION

The present invention aims to solve the above problems, and an object of the present invention is to provide an alternator enabling the achievement of high output, increased reliability, and improved productivity by constructing a stator coil with a number of winding sub-portions composed of continuous wire, thereby reducing coil end height and reducing the number of coil-end joining portions.

An additional object of the present invention is to provide an alternator capable of achieving a reduced level of noise by forming a pitch between the circumferential air-gap centers of the adjacent slot opening portions non-uniformly, thereby reducing higher order components of the magnetomotive force harmonic frequencies of the stator which cause electromagnetic noise.

In order to achieve the above object, according to one aspect of the present invention, there is provided an alternator including:

a stator having an annular stator core provided with a number of slots extending axially disposed in lines circumferentially so as to open on an inner circumferential side and a stator coil wound into the stator core so as to be installed in the slots;

a rotor having a number of claw-shaped magnetic poles for alternately forming north-seeking (N) and south-seeking (S) poles about a rotational circumference, the rotor being rotatably disposed on the inner circumferential side of the stator core;

a bracket supporting the rotor and the stator; and a rectifier disposed at a first axial end of the stator and connected to end portions of the stator coil, the rectifier converting alternating current from the stator coil into direct current, wherein a number of slots is two per phase per pole; and the stator coil comprises a number of winding sub-portions in each of which a long strand of wire is wound so as to alternately occupy an inner layer and an outer layer in a slot depth direction within the slots at intervals of a predetermined number of slots by folding back the strand of wire outside the slots at axial end surfaces of the stator core.

DETAILED DESCRIPTION OF THE PREFERRED EMBODIMENTS

The preferred embodiments of the present invention will now be explained with reference to the drawings.

EMBODIMENT 1

Figure 1:
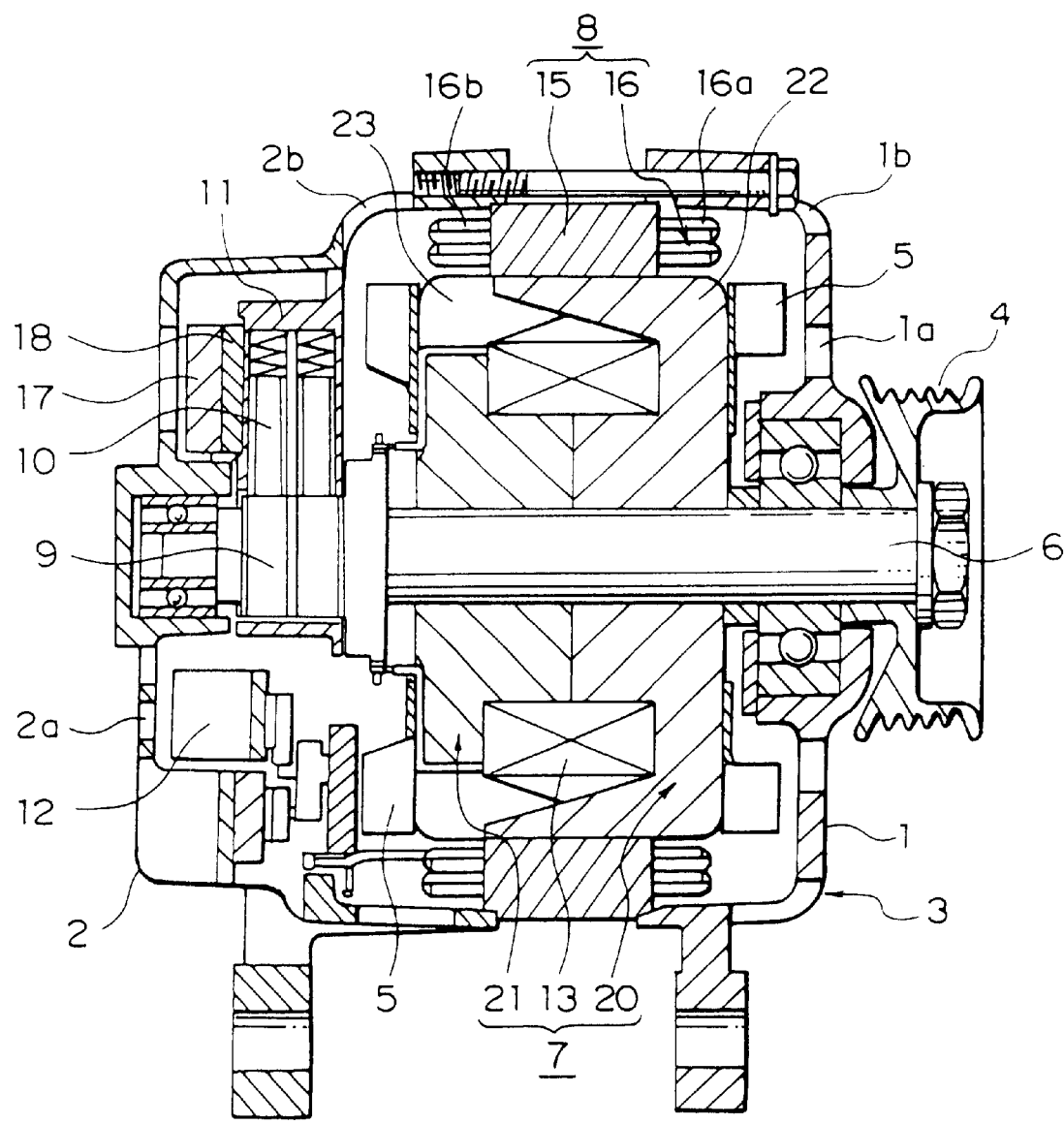
FIG. 1 is a cross section showing a construction of an automotive alternator according to Embodiment 1 of the present invention.
Figure 2:
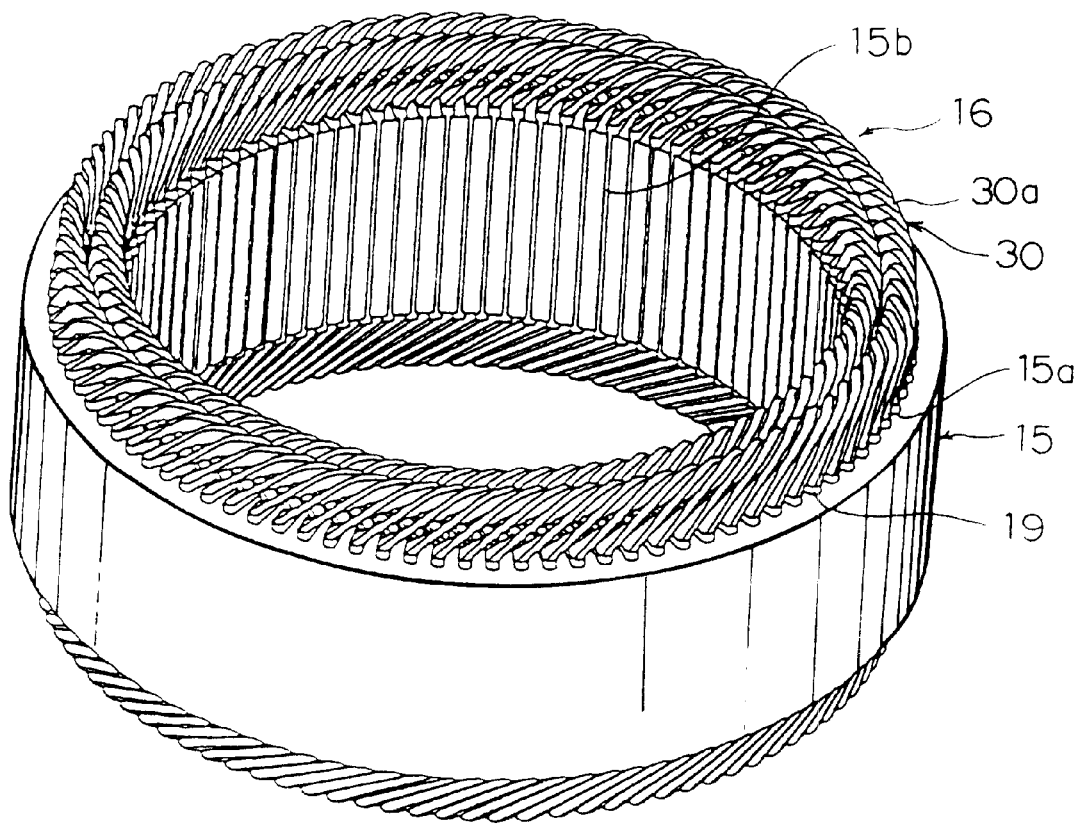
FIG. 2 is a perspective showing a stator of the automotive alternator according to Embodiment 1 of the present invention.
Figure 3:
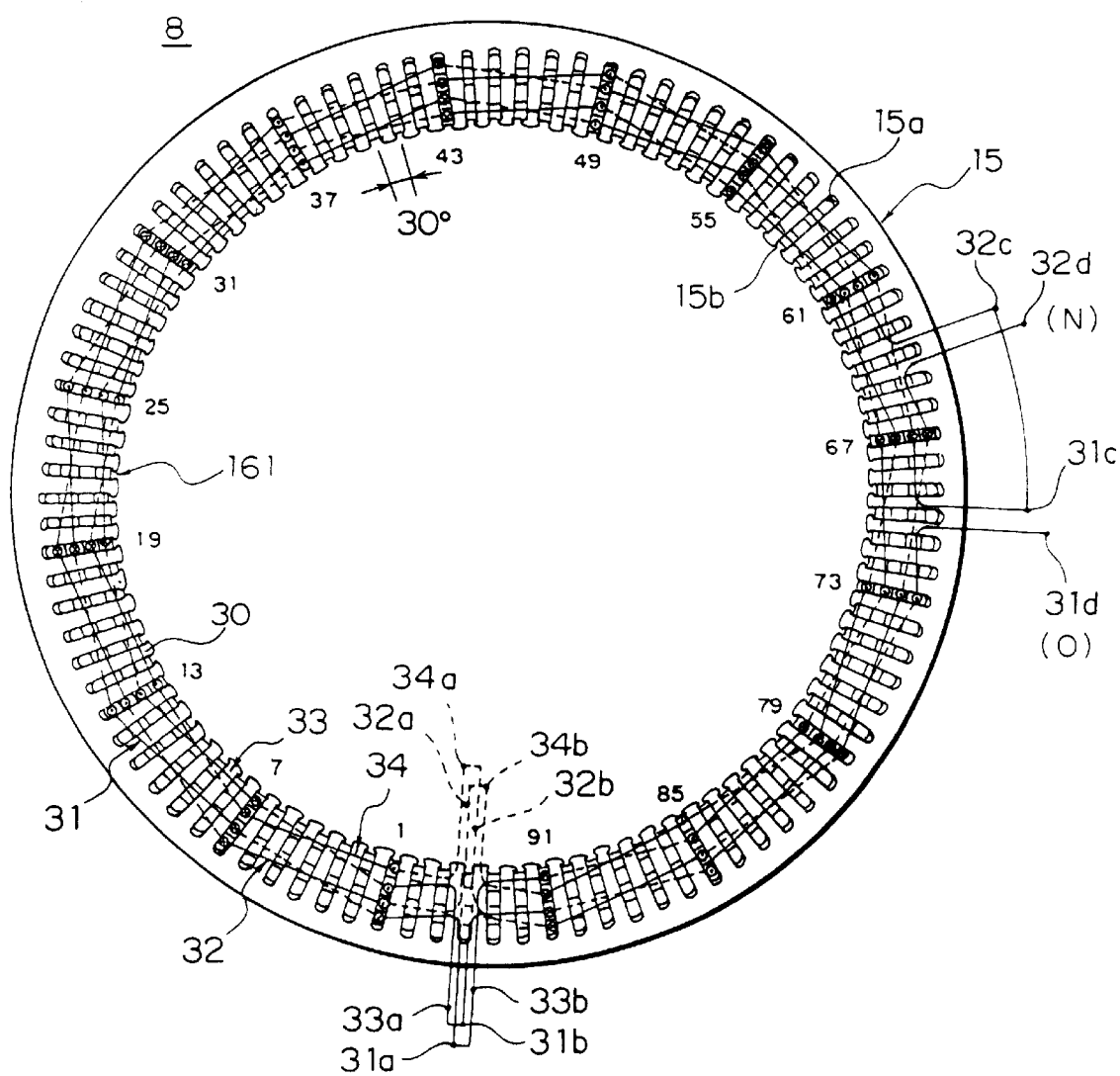
FIG. 3 is an end elevation explaining connections in one stator coil phase portion in the automotive alternator according to Embodiment 1 of the present invention.
Figure 4:
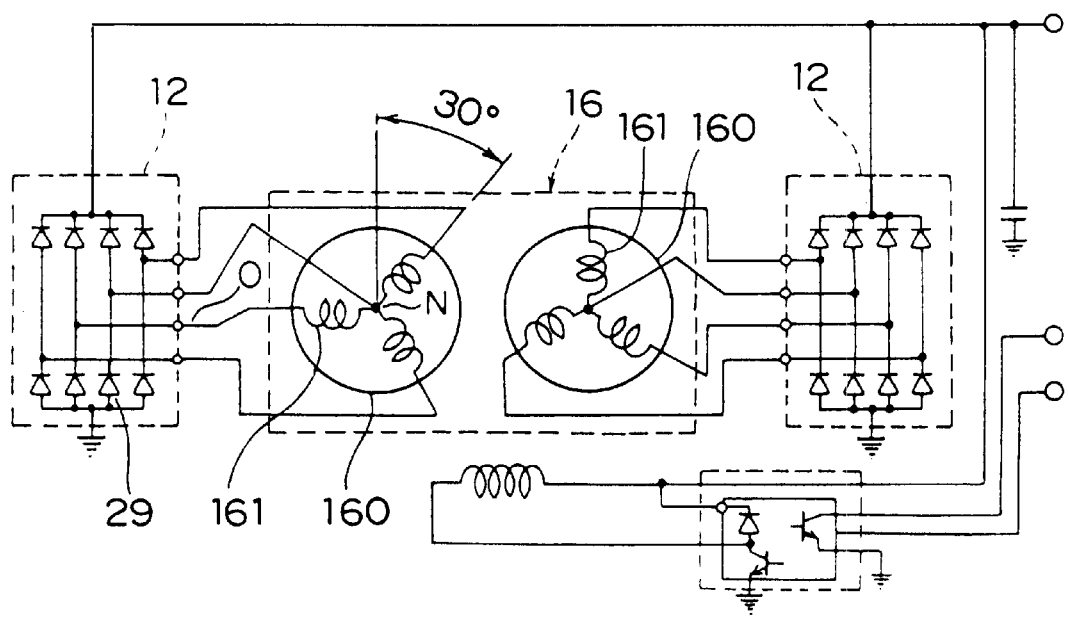
FIG. 4 is a circuit diagram for the automotive alternator according to Embodiment 1 of the present invention.
Figure 5:
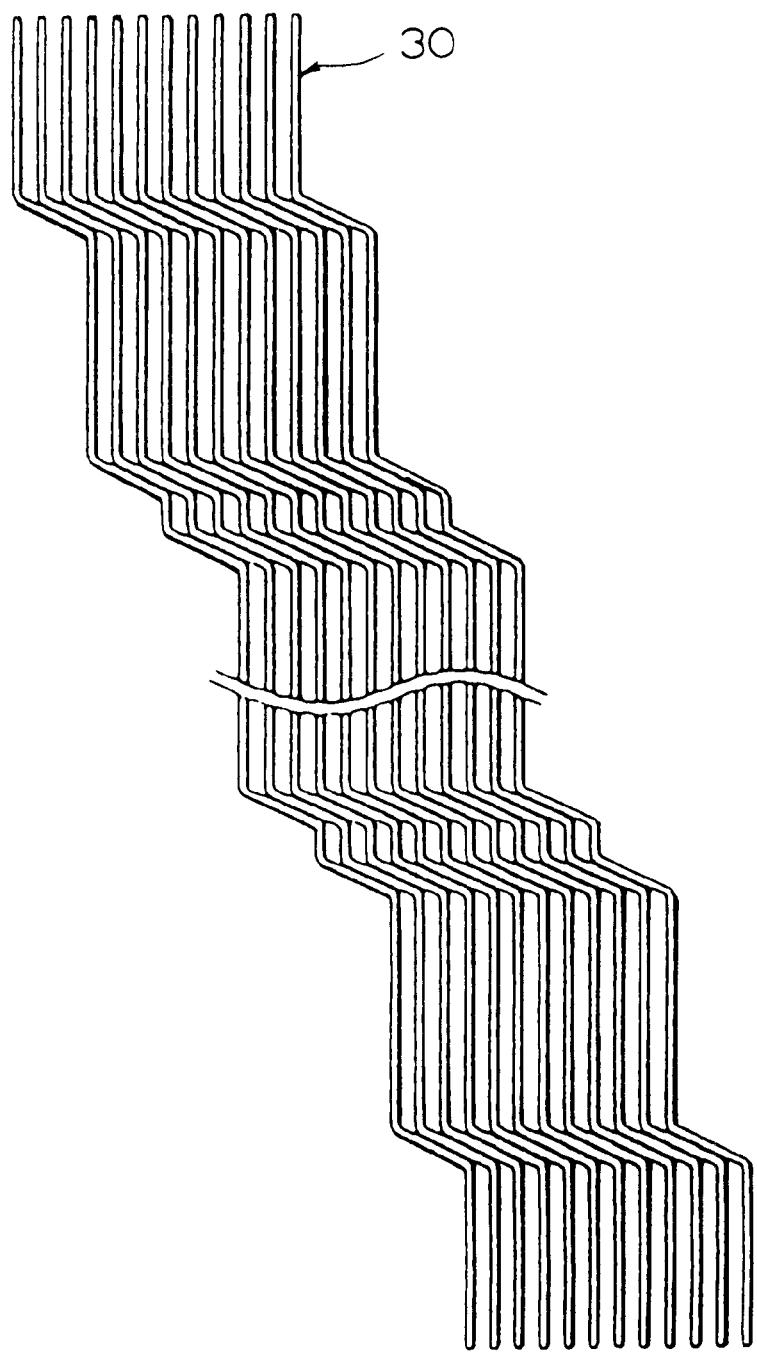
FIG. 5 is a diagram explaining the manufacturing process for wire-strand groups constituting part of the stator coil used in the automotive alternator according to Embodiment 1 of the present invention.
Figure 6:
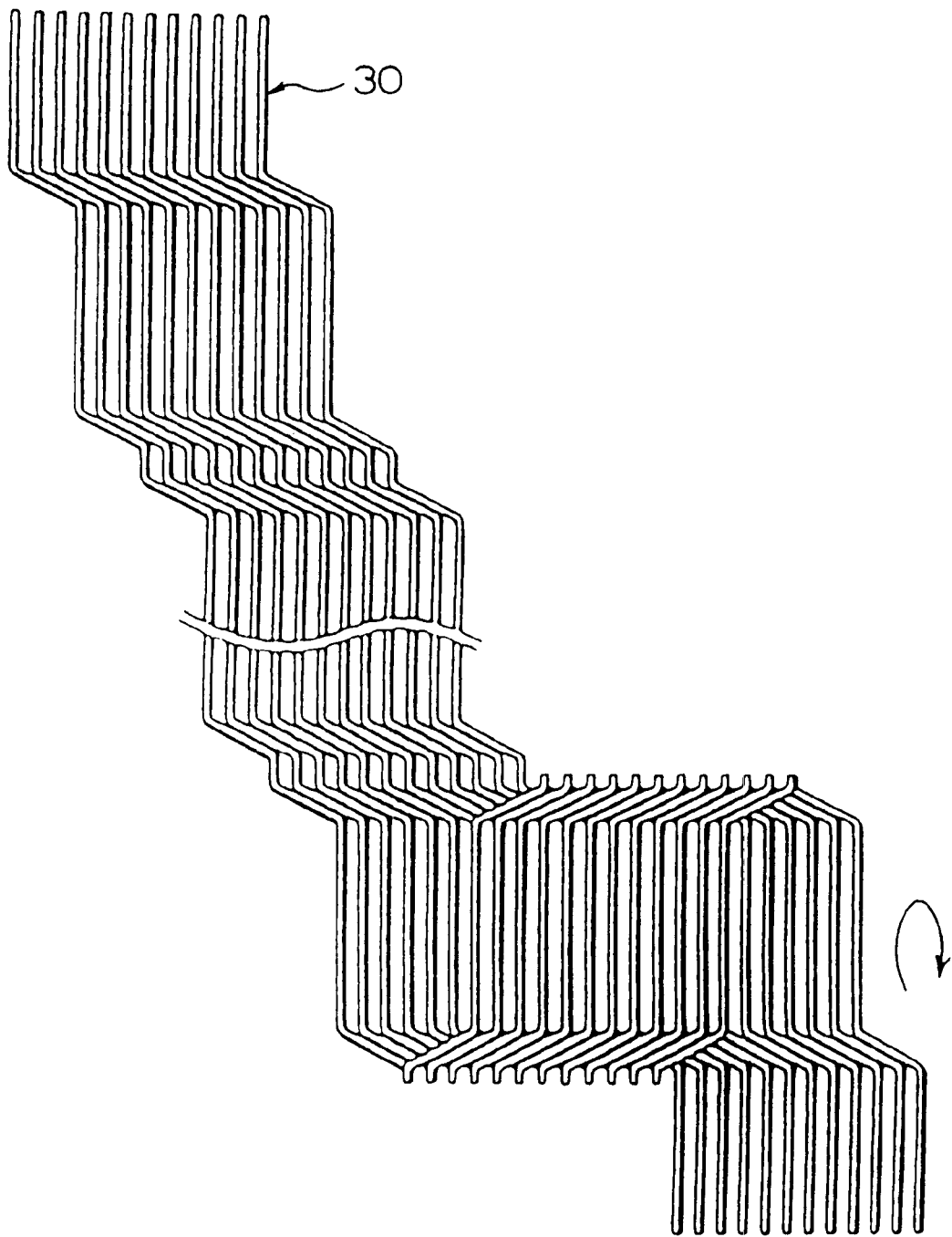
FIG. 6 is a diagram explaining the manufacturing process for wire-strand groups constituting part of the stator coil used in the automotive alternator according to Embodiment 1 of the present invention.
Figure 7:
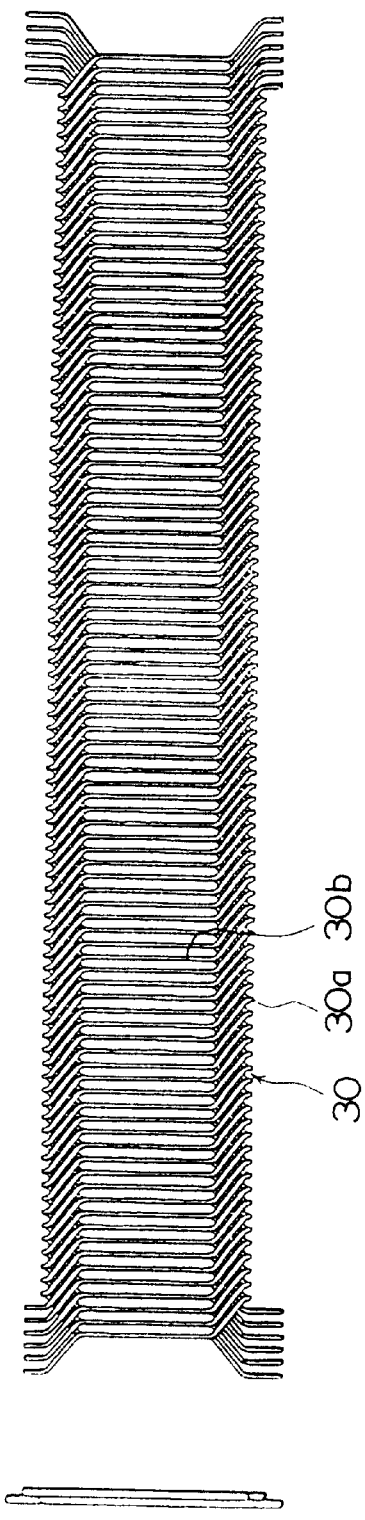
FIGS. 7A and 7B are an end elevation and a plan, respectively, showing an inner-layer wire-strand group constituting part of the stator coil used in the automotive alternator according to Embodiment 1 of the present invention.
Figure 8:
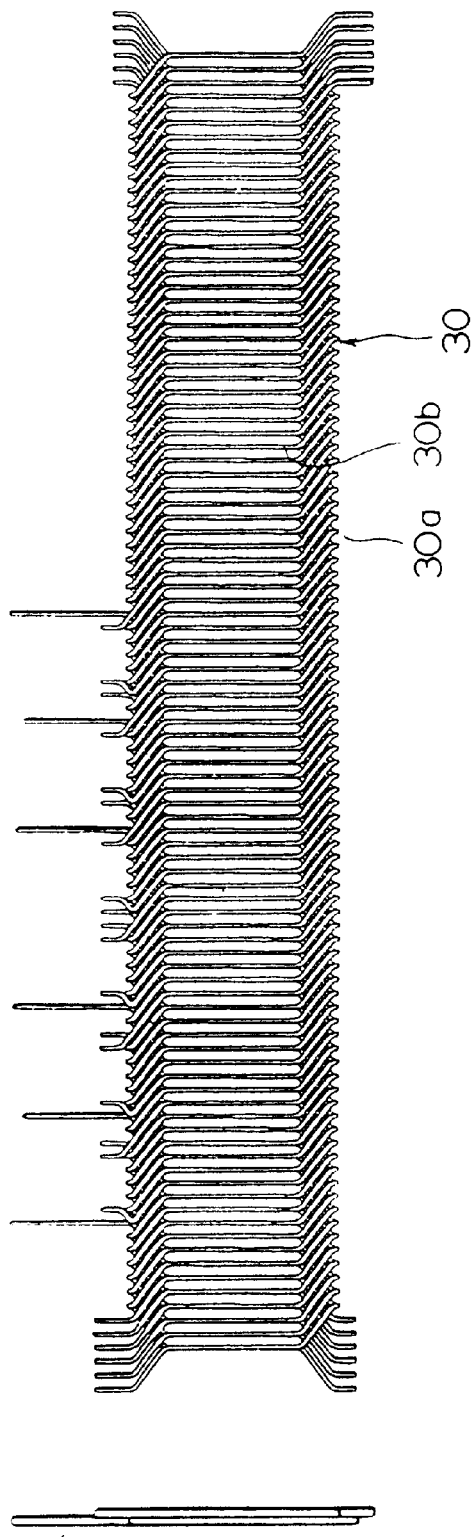
FIGS. 8A and 8B are an end elevation and a plan, respectively, showing an outer-layer wire-strand group constituting part of the stator coil used in the automotive alternator according to Embodiment 1 of the present invention.
Figure 9:
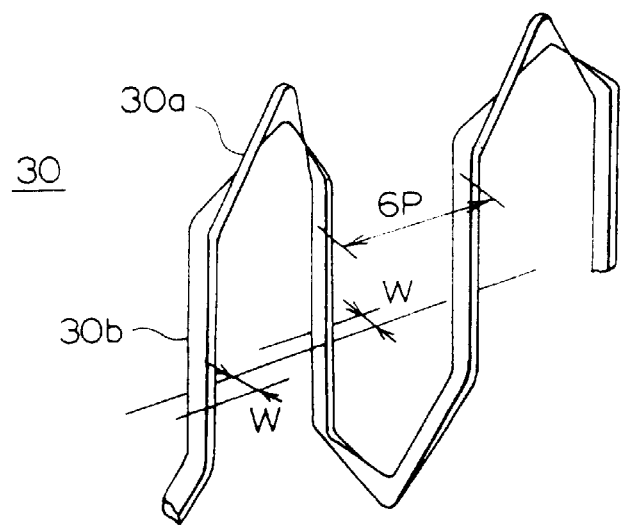
FIG. 9 is a perspective showing part of a strand of wire constituting part of the stator coil used in the automotive alternator according to Embodiment 1 of the present invention.
Figure 10:
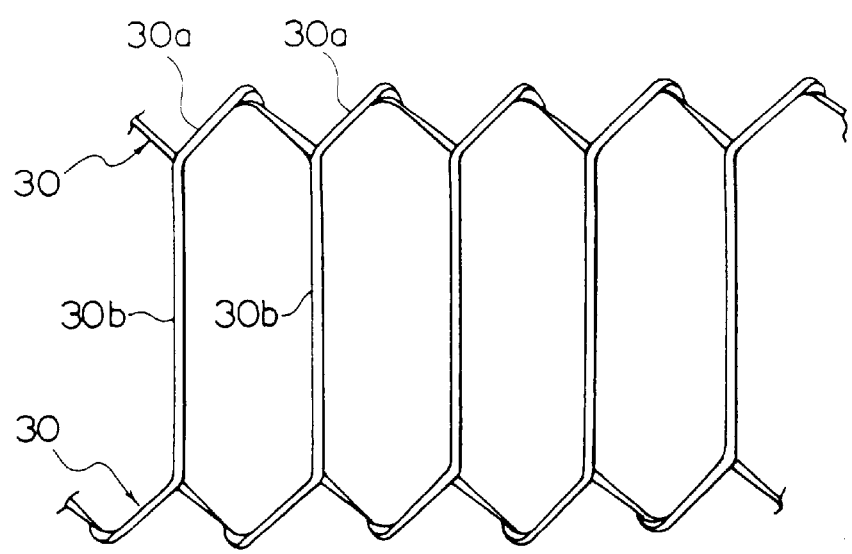
FIG. 10 is a diagram explaining the arrangement of strands of wire constituting part of the stator coil used in the automotive alternator according to Embodiment 1 of the present invention.
Figure 11:
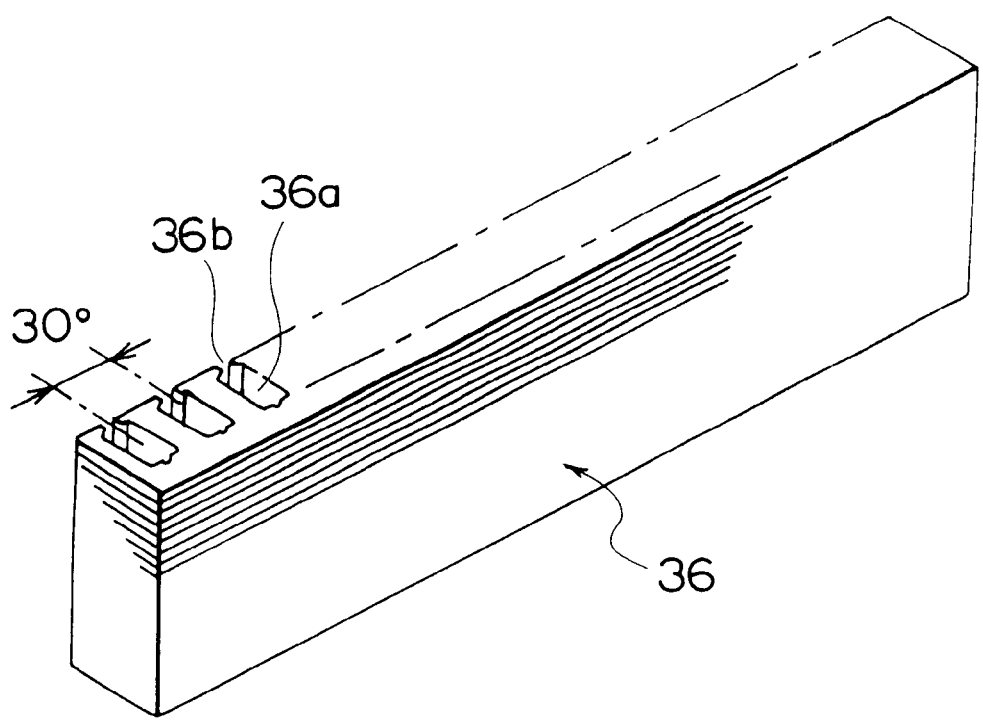
FIG. 11 is a diagram explaining the construction of a stator core used in the automotive alternator according to Embodiment 1 of the present invention.
Figure 12A:
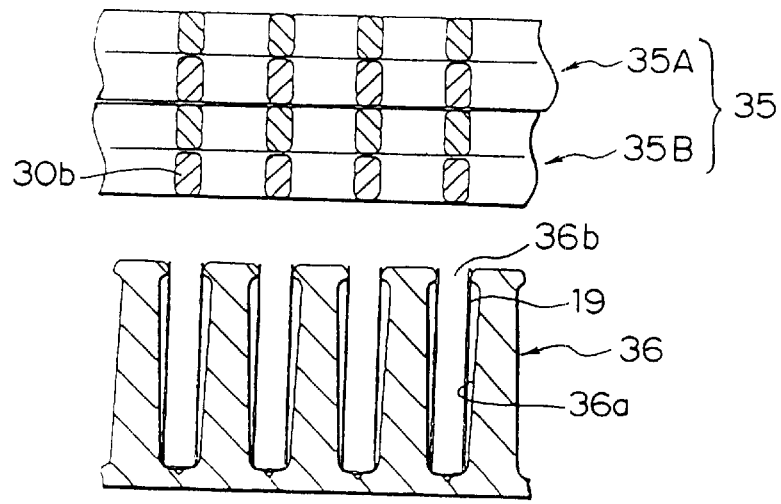
FIGS. 12A, 12B, and 12C are cross sections explaining the manufacturing process for the stator used in the automotive alternator according to Embodiment 1 of the present invention.
Figure 12B:
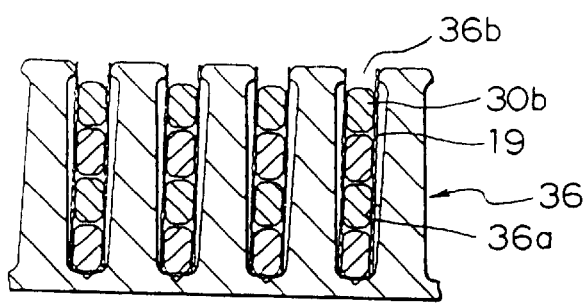
Figure 12C:
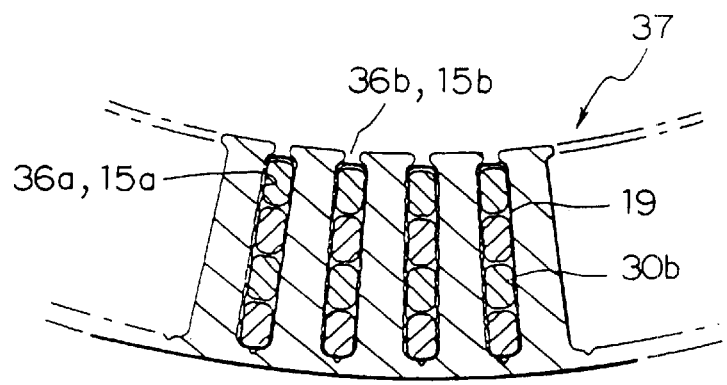
Figure 13:
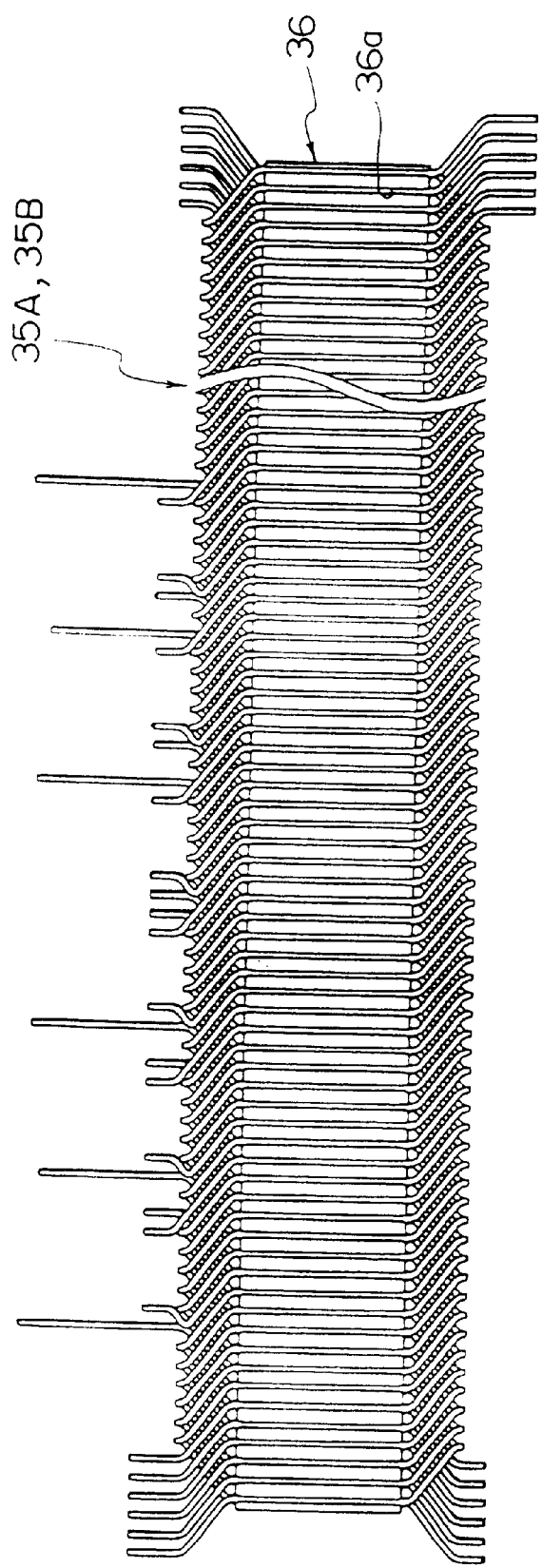
FIG. 13 is a plan showing a wire-strand group constituting part of the stator winding used in this automotive alternator mounted into the core according to Embodiment 1 of the present invention.

FIG. 1 is a cross section showing a construction of an automotive alternator according to Embodiment 1 of the present invention, FIG. 2 is a perspective showing a stator of this automotive alternator, FIG. 3 is an end elevation explaining connections in one stator coil phase portion in this automotive alternator, FIG. 4 is a circuit diagram for this automotive alternator, FIGS. 5 and 6 are diagrams explaining the manufacturing process for wire-strand groups constituting part of the stator coil used in this automotive alternator, FIGS. 7A and 7B are an end elevation and a plan, respectively, showing an inner-layer wire-strand group constituting part of the stator coil used in this automotive alternator, FIGS. 8A and 8B are an end elevation and a plan, respectively, showing an outer-layer wire-strand group constituting part of the stator coil used in this automotive alternator, FIG. 9 is a perspective showing part of a strand of wire constituting part of the stator coil used in this automotive alternator, FIG. 10 is a diagram explaining arrangement of the strands of wire constituting part of the stator coil used in this automotive alternator, FIG. 11 is a perspective explaining the construction of a stator core used in this automotive alternator, FIGS. 12A to 12C are cross sections explaining the manufacturing process for the stator used in this automotive alternator, and FIG. 13 is a plan showing a wire-strand group constituting part of the stator coil used in this automotive alternator mounted into the core. Moreover, output wires and crossover connections have been omitted from FIG. 2.

In FIG. 1, the automotive alternator is constructed by rotatably mounting a Lundell-type rotor 7 inside a case 3 constructed from an aluminum front bracket 1 and an aluminum rear bracket 2 by means of a shaft 6, and fastening a stator 8 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Air intake openings 1a and 2a are disposed in axial end surfaces of the front bracket 1 and the rear bracket 2, and air discharge openings 1b and 2b are disposed in two outer circumferential shoulder portions of the front bracket 1 and the rear bracket 2, opposite the radial outside of the front-end and rear-end coil ends 16a and 16b of the stator coil 16.

As shown in FIG. 2, the stator 8 includes: a cylindrical stator core 15 composed of a laminated core formed with a number of slots 15a extending axially at a predetermined pitch in a circumferential direction; a stator coil 16 wound onto the stator core 15; and insulators 19 installed in each of the slots 15a for electrically insulating the stator coil 16 from the stator core 15. The stator coil 16 includes a number of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two three-phase coils such that the number of slots housing each phase of the winding portions corresponds to the number of magnetic poles (sixteen) in the rotor 7. Furthermore, the circumferential air-gap center of the slot 15a corresponds with the circumferential air-gap centers of the opening portions 15b, the circumferential air-gap centers being formed at a pitch corresponding to an electrical angle of 30°. In this manner, the two three-phase coils have a mutual phase difference corresponding to an electrical angle of 30°. The number of slots is two per phase per pole.

Long, insulated copper wire material having a rectangular cross section, for example, is used in the strands of wire 30.

Next, the winding construction of one coil phase portion 161 will be explained in detail with reference to FIG. 3.

One coil phase portion 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one coil phase portion 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a crossover connection connecting portion, and a second cut end 31d of the first winding sub-portion 31 and a second cut end 32d of the second winding sub-portion 32 become an output wire (O) and a neutral point (N), respectively.

A total of six coil phase portions 161 are similarly formed by offsetting the slots 15a into which the strands of wire 30 are wound one slot at a time. Then, as shown in FIG. 4, three coil phase portions 161 are connected into each of two star connections to form the two three-phase coils 160, and each of the three-phase coils 160 is connected to its own rectifier 12. The rectifiers 12 are connected in parallel so that the direct-current output from each is combined. Furthermore, the neutral points (N) of the three-phase coils 160 are connected to the direct current output terminals of the rectifiers 12 through diodes 29.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into a substantially identical shape at both axial ends of the stator core 15 are mutually spaced circumferentially and radially, and arranged neatly in two rows circumferentially, to form coil end groups 16a and 16b.

Next, the assembly of the stator 8 will be explained with reference to FIGS. 5 to 13.

First, as shown in FIG. 5, twelve long strands of wire 30 are simultaneously bent in the same plane to form a lightning-bolt shape. Then, a wire-strand group 35A, shown in FIGS. 7A and 7B, is prepared by progressively folding the strands at right angles, as indicated by the arrow in FIG. 6, using a jig. In addition, a wire-strand group 35B including crossover connections and output wires, as shown in FIGS. 8A and 8B, is prepared in a similar manner. Moreover, in FIGS. 8A and 8B, the portions extending outwards from both ends of the wire-strand group 35B are correspond to the crossover connection portions and the output wire portions.

The wire-strand groups 35A and 35B are then annealed for ten minutes at 300° C. so that a parallelepiped core 36 mounted with the wire-strand groups 35A and 35B can be easily formed into an annular shape.

Moreover, as shown in FIG. 9, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 10. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

The parallelepiped core 36 is prepared as shown in FIG. 11 by laminating a predetermined number of sheets of SPCC material, which is a magnetic material, formed with trapezoidal slots 36a at a predetermined pitch (an electrical angle of 30°) and laser welding an outer portion thereof.

As shown in FIG. 12A, the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG. 12B. At this time, straight portions 30b of the strands of wire 30 are housed in lines of four in a radial direction within the slots 36a and are electrically insulated from the parallelepiped core 36 by the insulators 19. The two wire-strand groups 35A and 35B are stacked one on top of the other when installed in the parallelepiped core 36 as shown in FIG. 13.

Next, the parallelepiped core 36 is rolled up and its ends abutted and welded to each other to obtain a cylindrical stator core 15, as shown in FIG. 12C. By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the strands of wire 30 are connected to each other based on the connections shown in FIG. 3 to form the coil phase portions 161, and three coil phase portions 161 are formed into each of two star connections to form the three-phase coils 160. In this manner, the stator coil 16 is wound into the stator core 15 to obtain stator 8.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator coil 16, generating electromotive force in the stator coil 16. This alternating electromotive force passes through the rectifiers 12 and is converted into direct current, the magnitude of the voltage is adjusted by the regulator 18, and the battery is recharged.

At the rear end, external air is drawn in through the air intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the stator coil 16 before being expelled to the outside through the air discharge openings 2b. At the same time, at the front end, external air is drawn in axially through the air intake openings 1a by rotation of the fans 5, and is then deflected centrifugally by the fans 5, cooling the front-end coil end group 16a of the stator coil 16 before being expelled to the outside through the air discharge openings 1b.

In this manner, according to Embodiment 1 of the present invention, the stator coil 16 includes two three-phase coils 160, each of the three-phase coils 160 being constructed by joining three coil phase portions 161 into an alternating-current connection. In addition, the coil phase portions 161 are constructed by connecting the first to fourth winding sub-portions 31 to 34 in series. The first winding sub-portion 31 is constructed by wave winding one strand of wire 30 so as to alternately occupy the first and second positions from the outer circumferential side of every sixth slot 15a. In other words, the first winding sub-portion 31 is constructed by wave winding one strand of wire 30 for one lap so as to alternately occupy the inner layer and the outer layer in a slot depth direction. Similarly, the second, third, and fourth winding sub-portions 32, 33, and 34 are also constructed by wave winding single strands of wire 30 for one lap so as to alternately occupy inner and outer layers in a slot depth direction.

Thus, because the first to fourth winding sub-portions 31 to 34 constituting the stator coil 16 are each composed of one strand of wire 30 (continuous wire), the intricate operation of inserting a large number of short conductor segments 54 into the stator core 51 and joining the end portions 54b to each other by welding, soldering, etc., required in the conventional stator 50 has been eliminated, and in addition, because there are no short-circuiting accidents as a result of spilt solder or weld melt when the end portions 54b are being joined together as occurred the conventional stator 50, it is possible to improve the productivity of the stator 8.

Furthermore, because the process of bending the conductors after they have been inserted into the stator core which was performed with the conventional stator 50 is no longer necessary, the stator coil 16 can be wound without damaging the teeth, even in a stator core 15 having ninety-six teeth which otherwise makes the width of the teeth narrow and reduces rigidity.

Furthermore, because the coil ends are formed by the turn portions 30a, the height extending outwards from the end surface of stator core 15 can be reduced compared to the conventional coil ends in which the end portions 54b of the conductor segments 54 were joined together. Thus, because the coil-end leakage reactance can be reduced, drops in leakage reactance can be reduced and output can be improved.

Furthermore, because the coil ends are formed by the turn portions 30a, there is no longer any need to join together the end portions of the conductor segments, as was conventionally required, that is to say, there is no expansion in the conductor segments, and even if the number of claw-shaped magnetic poles and the number of slots are increased, the pitch between the coils of the coil ends is not excessively reduced, and at the same time, the height of the coil ends can be reduced. Thus, when electric current with a phase difference passed through the coils, mutual interference between the coils in the coil ends is suppressed and deterioration in output is prevented.

The number of slots housing the stator coil 16 is two per pole per phase, and because there are two three-phase coils 160 disposed so as to have a mutual phase difference, the magnetomotive wave form can be made to approximate a sinusoidal wave, reducing higher harmonic wave components and ensuring stable output. Furthermore, because the circumferential air-gap centers of the slots 15a and the slot opening portions 15b are arranged at a uniform pitch corresponding to an electrical angle of 30°, magnetic pulsation which cause magnetic noise excitation forces can be reduced.

Furthermore, there is no softening due to welding, there is higher rigidity in the stator, and magnetic noise can be reduced.

Furthermore, because the first to fourth winding sub-portions 31 to 34 forming the stator coil 16 are each made from one strand of wire 30 (continuous wire), reliability can be improved.

More specifically, because the coil ends are constituted by the turn portions 30a of the strands of wire 30, the only joints in the coil end groups 16a and 16b are among the end portions of the first to fourth winding sub-portions 31 to 34 and the crossover connection joint portions, significantly reducing the number of joints. Thus, the occurrence of short-circuiting accidents which accompany loss of insulation due to the joining process is suppressed and resistance to corrosion is increased. Furthermore, damage to the insulation coating as a result of pushing the conductor segments 52 axially into the slots 51a which occurred in the conventional stator 50 is prevented.

In addition, four strands of wire 30 are arranged in one row radially within the slots 15a, and the turn portions 30a are lined up in two rows in a circumferential direction. In this way, because the turn portions 30a forming the coil-end groups 16a and 16b are each distributed into two rows radially, the height of the coil-end groups 16a and 16b extending outwards from both end surfaces of stator core 15 can be reduced. As a result, wind resistance is reduced, and wind noise coming from the rotation of the rotor 7 can be reduced, and at the same time, coil leakage reactance can also be reduced.

Furthermore, each of the turn portions 30a can easily be formed into the same general shape. Thus, because circumferential irregularities on radially inner end surfaces of the coil-end groups 16a and 16b can be eliminated by forming each of the turn portions 30 into the same general shape, that is to say, by forming the turn portions 30a which constitute the coil-end groups 16a and 16b into the same general shape in a circumferential direction, wind noise which occurs between the rotor 7 and the coil-end groups 16a and 16b can be reduced. Furthermore, turn portions 30a are separated in a circumferential direction, and because the spaces between turn portions 30a are constructed to be generally the same in a circumferential direction, cooling can be increased and at the same time, noise due to interference between the cooling air and the coil ends is reduced.

Because the straight portions 30b are formed with a rectangular cross section, the cross-sectional shape of the straight portions 30b fits neatly into the shape of the slots 15a when the straight portions 30b are housed inside the slots 15a. Thus, the space factor of the strands of wire 30 inside the slots 15a is easily increased, enabling improved transfer of heat from the strands of wire 30 to the stator core 15. Here in Embodiment 1, the straight portions 30b are formed into a rectangular cross section, but the cross-sectional shape of the straight portions 30b may be any generally rectangular shape which fits neatly into the generally rectangular shape of the slots. This generally rectangular shape is not limited to a true rectangular shape and may be a square shape, a shape consisting of four flat surfaces with rounded corners, or an elongated elliptical shape in which the short sides of the rectangle are made into arcs, etc.

Then, as shown in FIG. 4, three coil phase portions 161, which are formed by connecting the first to fourth winding sub-portions 31 to 34 in series, are connected into each of two star connections to form the two three-phase coils 160, each of the three-phase coils 160 is connected to its own rectifier 12, and the two rectifiers 12 are connected in parallel. Thus, the output of the rectifiers connected to the two three-phase coils 160 can be combined and extracted, enabling elimination of power generation deficiency in low rotational frequency regions. Furthermore, because electric current does not flow from one phase of the winding portion to another, there is no deterioration in temperature in the winding. Thus, the temperature of the stator coil 16 is decreased, deterioration of the insulation coating is suppressed, and insulation properties are significantly improved.

In general, if the rotational speed exceeds 2000 rpm in an automotive alternator, and especially if it exceeds 2500 rpm, neutral-point voltage fluctuates so as to be greater than output voltage and less than ground potential. Because the neutral points (N) of the three-phase coils 160 are connected to the output terminals of the rectifiers 12 through diodes 29, large fluctuations in neutral-point voltage can be effectively used to enable improved output regions where the rotational speed exceeds 2000, and especially where it exceeds 2500 rpm.

Furthermore, because the two wire-strand groups 35A and 35B composed of continuous wire can be aligned in two rows and inserted the slots 15A of the stator core 15, operability can be significantly increased compared with the conventional art in which a large number of conductor segments 54 are inserted into each of the slots.

Furthermore, increases in the number of turns in the stator coil 16 can easily be adapted to by installing the wire-strand groups 35 (35A and 35B) which are composed of continuous wire by stacking them such that the straight portions 30b thereof line up relative to each other.

EMBODIMENT 2

Figure 14:
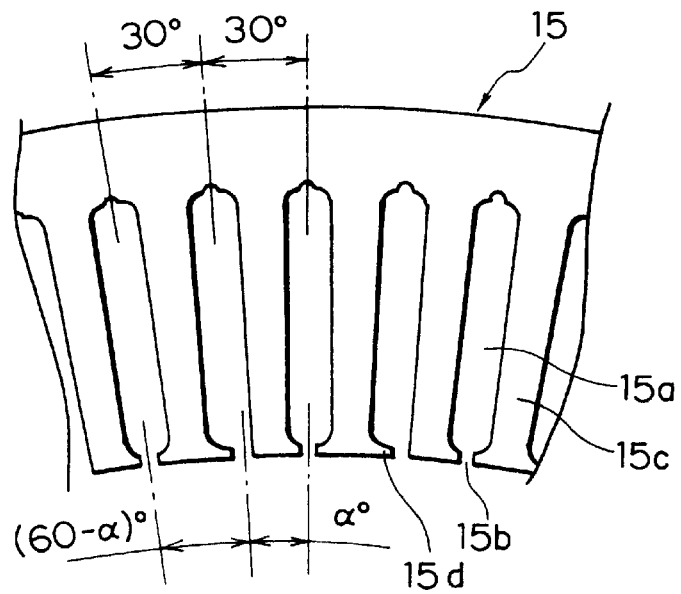
FIG. 14 is a partial front elevation explaining the construction of a stator core used in an automotive alternator according to Embodiment 2 of the present invention.
Figure 15:
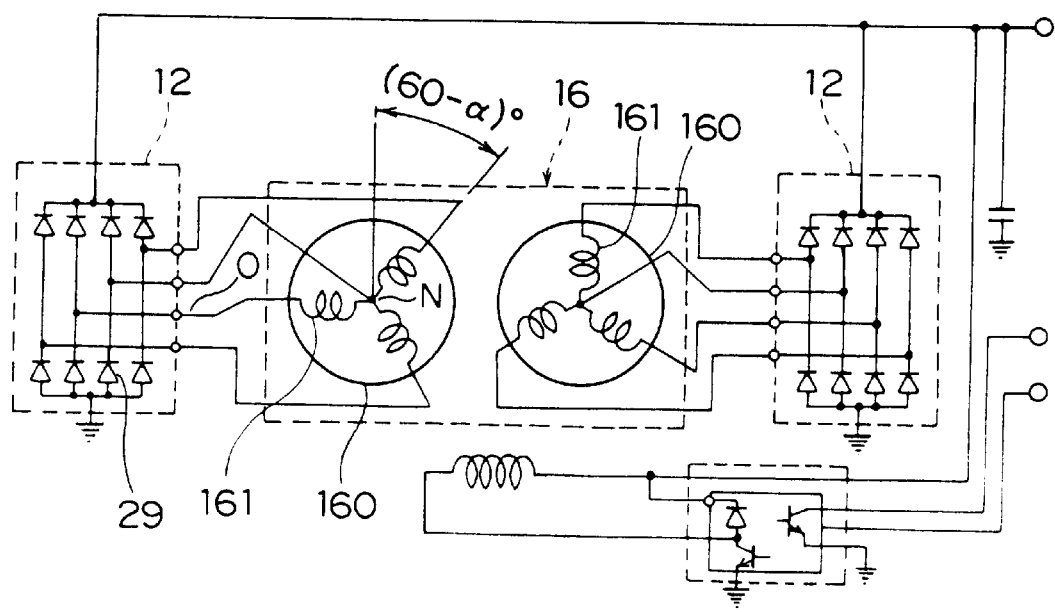
FIG. 15 is a circuit diagram for the automotive alternator according to Embodiment 2 of the present invention.

In Embodiment 2 of the present invention, as shown in FIG. 14, by adjusting a length of circumferential extension of flanges 15d disposed on end portions of teeth 15c, circumferential air-gap centers of adjacent slot opening portions 15b are disposed at a non-uniform pitch so as to alternate between an electrical angle of $\alpha°$ and an electrical angle of $(60-\alpha)°$. The circumferential air-gap centers of the slots 15a are arranged at a uniform pitch corresponding to an electrical angle of 30°. Furthermore, as shown in FIG. 15, the two three-phase coils 160 forming the stator coil 16 are disposed so as to have a mutual phase difference of $(60-\alpha)°$. Here, a is not equal to 30 ($\alpha \neq 30$).

Moreover, the rest of the construction is formed in the same way as in Embodiment 1 above.

In Embodiment 2 of the present invention, because the phase difference between the phases in each of the three-phase coils 160 does not change, there is no decrease in output. Furthermore, because the two three-phase coils 160 are disposed so as to have a mutual phase difference corresponding to an electrical angle of $(60-\alpha)°$ and the circumferential air-gap centers of the adjacent slot opening portions 15b have a non-uniform pitch so as to alternate between an electrical angle of $\alpha°$ and an electrical angle of $(60-\alpha)°$, the higher harmonic components of the magnetomotive force which are the cause of electromagnetic noise can be reduced. Thus, by using the construction of Embodiment 2 of the present invention, a sufficient level of noise reduction can be achieved even in an automotive alternator having compactness and high output where magnetic noise is promoted by an increased number of claw-shaped magnetic poles and slots.

Furthermore, by changing the length of circumferential extension of the flanges 15d disposed on the end portions of the teeth 15c, the pitch between the circumferential air-gap centers of adjacent slot opening portions 15b can be adjusted simply.

Figure 16:
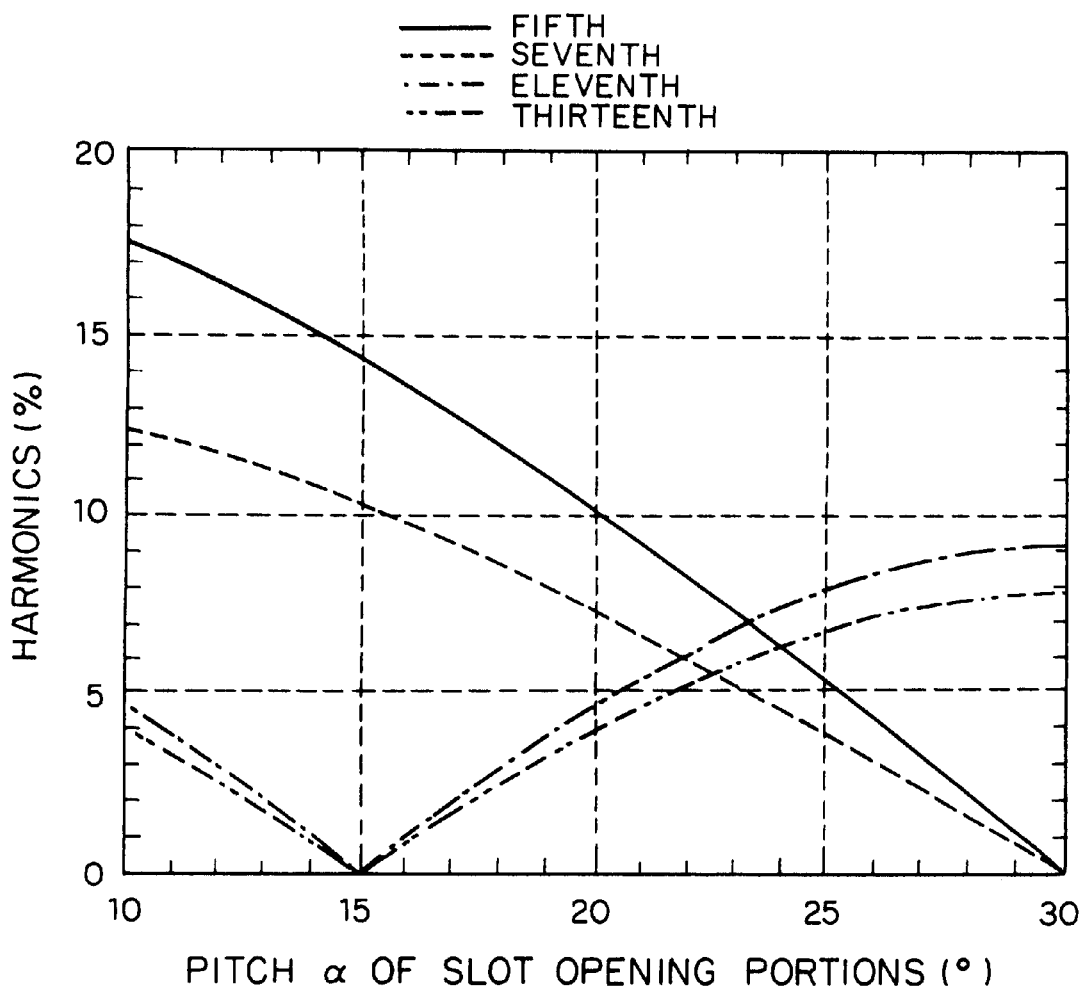
FIG. 16 is a graph of characteristics showing changes in stator magnetomotive harmonic frequency relative to various pitches of slot opening portions used in the automotive alternator according to Embodiment 2 of the present invention.

Now, stators were prepared using stator cores in which the pitch between the circumferential air-gap centers of the adjacent slot opening portions 15b was made nonuniform by changing the length of circumferential extension of the flanges 15d disposed on the end portions of the teeth 15c, the change in harmonic frequencies of the magnetomotive force of the stator relative to $\alpha°$ which is the pitch between the circumferential air-gap centers of the adjacent slot opening portions was measured, and the results thereof are shown in FIG. 16.

From FIG. 16, it can be seen that if the pitch between the circumferential air-gap centers of the adjacent slot opening portions is within a range between a nonuniform pitch alternating between 16° and 44° and a nonuniform pitch alternating between 29° and 31°, the fifth, seventh, eleventh and thirteenth magnetomotive harmonic frequencies of the stator can be kept below a maximum value of 13 percent.

In addition, it can be seen that if the pitch between the circumferential air-gap centers of the adjacent slot opening portions is within a range between a nonuniform pitch alternating between 22° and 38° and a nonuniform pitch alternating between 24° and 36°, the fifth, seventh, eleventh and thirteenth magnetomotive harmonic frequencies of the stator can be kept below a maximum value of 8 percent, that is to say, the fifth, seventh, eleventh and thirteenth magnetomotive harmonic frequencies of the stator can be reduced in a balanced way.

Moreover, it can be seen that the most suitable pitch between the circumferential air-gap centers of the adjacent slot opening portions for reducing the seventh and eleventh magnetomotive harmonic frequencies of the stator is the nonuniform pitch alternating between 22° and 38°.

Furthermore, it can be seen that the most suitable pitch between the circumferential air-gap centers of the adjacent slot opening portions for reducing the fifth and thirteenth magnetomotive harmonic frequencies of the stator is the nonuniform pitch alternating between 24° and 36°.

EMBODIMENT 3

Figure 17:
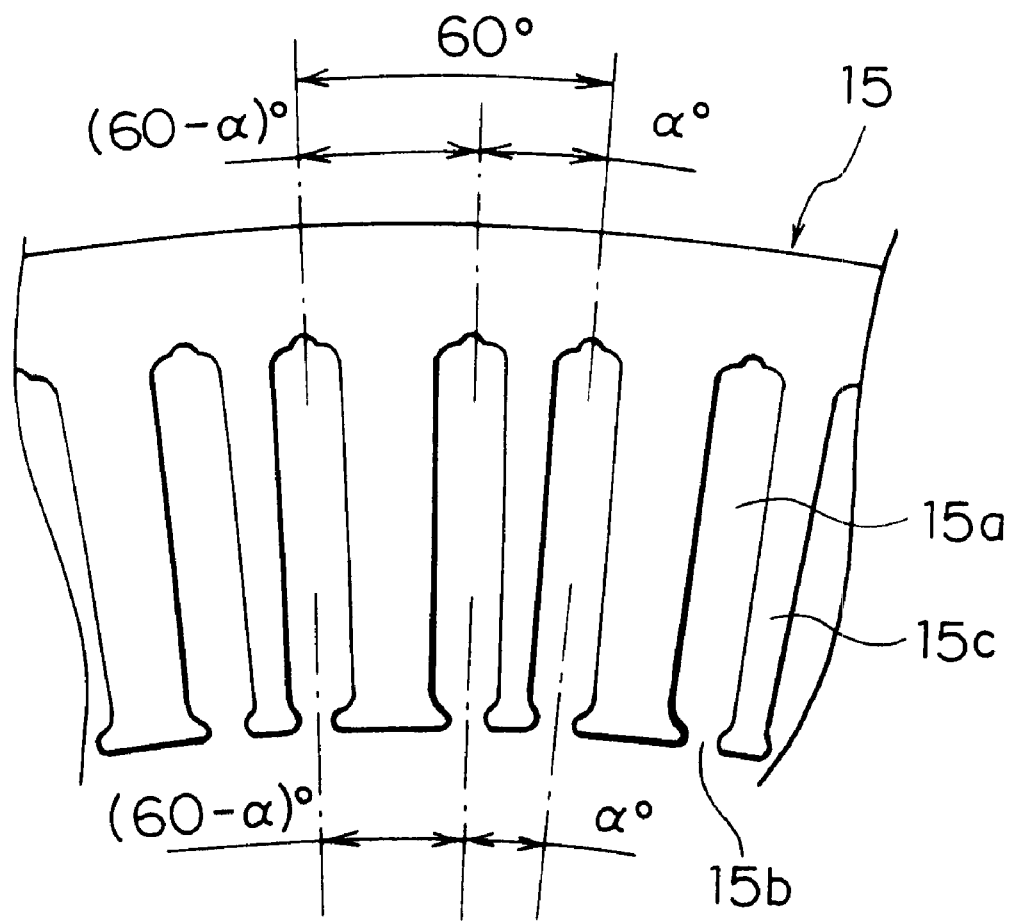
FIG. 17 is a partial front elevation explaining the construction of a stator core used in an automotive alternator according to Embodiment 3 of the present invention.
Figure 18:
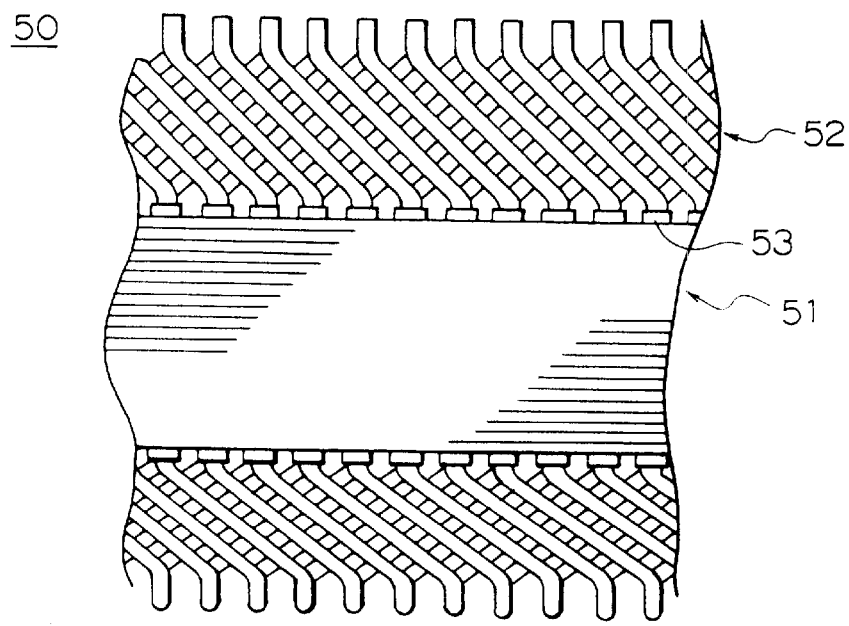
FIG. 18 is a side elevation showing part of a stator of a conventional automotive alternator.
Figure 19:
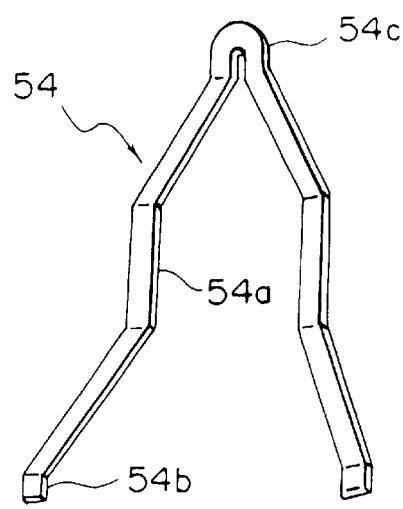
FIG. 19 is a perspective showing a conductor segment used in the stator of the conventional automotive alternator.
Figure 20:
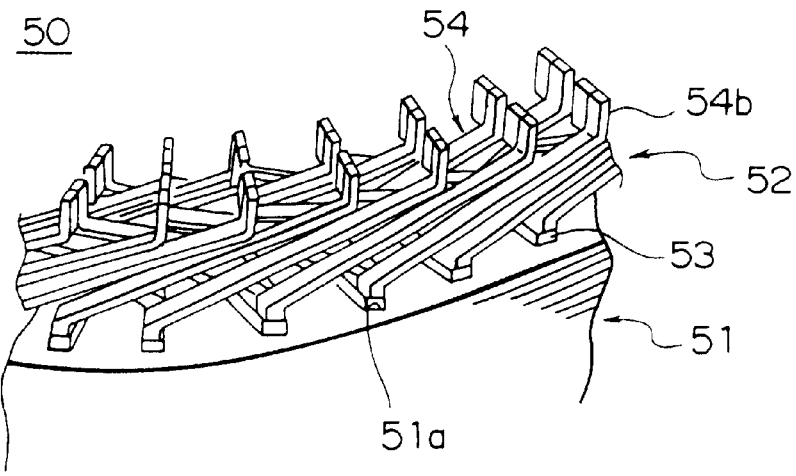
FIG. 20 is a perspective of part of the stator of the conventional automotive alternator from a front end.
Figure 21:
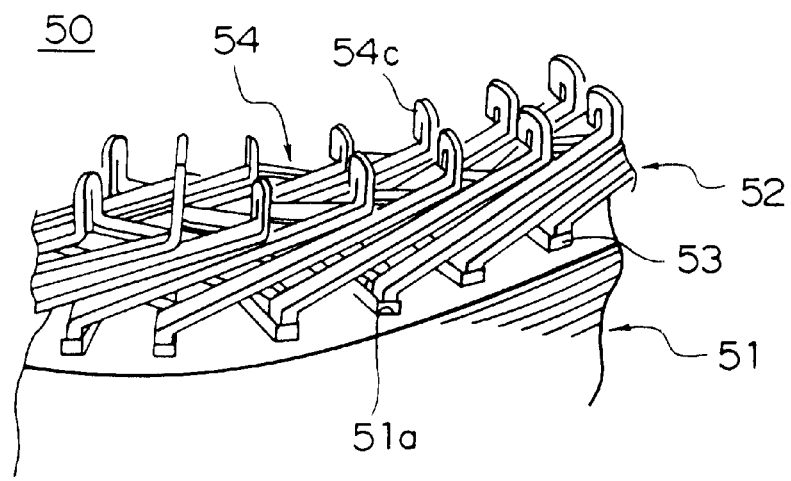
FIG. 21 is a perspective of part of the stator of the conventional automotive alternator from a rear end.

In Embodiment 3, as shown in FIG. 17, by adjusting a circumferential width of the teeth 15c, circumferential air-gap centers of adjacent slot opening portions 15b are disposed at a non-uniform pitch so as to alternate between an electrical angle of $\alpha°$ and an electrical angle of $(60-\alpha)°$. Thus, the circumferential air-gap centers of the slots 15a are arranged so as to alternate between an electrical angle of $\alpha°$ and an electrical angle of $(60-\alpha)°$. Thus, $\alpha \neq 30$.

Moreover, the rest of the construction is the same as in Embodiment 2 above.

In Embodiment 3, because the pitch between the circumferential air-gap centers of the adjacent slots 15a is arranged so as to alternate between an electrical angle of $\alpha°$ and $(60-\alpha)°$, the phase difference between the phases in each of the three-phase coils 160 does not change. Furthermore, the two three-phase coils 160 are arranged so as to have a mutual phase difference corresponding to an electrical angle of $(60-\alpha)°$, and the pitch between the circumferential air-gap centers of the adjacent slot opening portions 15b is arranged non-uniformly to alternate between an electrical angle of $\alpha°$ and an electrical angle of $(60-\alpha°)$. Consequently, the effects of Embodiment 2 can also be obtained in Embodiment 3.

Furthermore, because the width of teeth 15c is nonuniform, the magnetic flux passing through the narrow teeth 15c increases, promoting magnetic saturation, but in adjacent wide teeth 15c, magnetic saturation is instead moderated and there is no reduction in output.

Moreover, each of the above embodiments has been explained for four turns, but when even lower-speed output is required six turns or eight turns may be used. Such cases can also be adapted to simply by inserting wire-strand groups 35 into the stator core so as to stack up radially. Naturally, odd numbers of turns may also be used.

Furthermore, in each of the above embodiments, the number of slots in the stator was ninety-six slots for sixteen magnetic poles, but the same effects can be achieved when applied to a stator core having three phases and seventy-two slots for twelve magnetic poles, or to a stator core having 120 slots for twenty poles.

Furthermore, in each of the above embodiments, a field coil (rotor coil 13) is contained in the rotor, but the present invention may also be applied to alternators of the type in which a field coil is secured to a bracket, and magnetic poles are formed by supplying magnetic flux to the rotor core of the rotor across an air gap.

Furthermore, in each of the above embodiments, copper wire material having a rectangular cross section is used in the strands of wire, but the strands of wire are not limited to copper wire material having a rectangular cross section, and may, for example, be copper wire material having a circular cross section.

Further, the strands of wire are not limited to copper wire material, and may, for example, be aluminium wire material.

The present invention is constructed in the above manner and exhibits the effects described below.

According to one aspect of the present invention, there is provided an alternator comprising:

a stator having an annular stator core provided with a number of slots extending axially disposed in lines circumferentially so as to open on an inner circumferential side and a stator coil wound into the stator core so as to be installed in the slots;

a rotor having a number of claw-shaped magnetic poles for alternately forming north-seeking (N) and south-seeking (S) poles about a rotational circumference, the rotor being rotatably disposed on the inner circumferential side of the stator core;

a bracket supporting the rotor and the stator; and a rectifier disposed at a first axial end of the stator and connected to end portions of the stator coil, the rectifier converting alternating current from the stator coil into direct current, wherein a number of slots is two per phase per pole; and the stator coil comprises a number of winding sub-portions in each of which a long strand of wire is wound so as to alternately occupy an inner layer and an outer layer in a slot depth direction within the slots at intervals of a predetermined number of slots by folding back the strand of wire outside the slots at axial end surfaces of the stator core, thereby reducing the height of the coil ends and reducing the number of adjoining portions, enabling high output, high reliability and high productivity to be achieved.

Furthermore, because the stator coil may also be constructed by placing two three-phase coils so as to have a mutual phase difference, the three-phase coils being formed by connecting the winding sub-portions, and a pitch between circumferential air-gap centers of adjacent slot opening portions may also be formed so as to be nonuniform, the higher order components of the harmonic frequencies of the magnetomotive force which are a cause of electromagnetic noise can be reduced.

Furthermore, because the pitch between the circumferential air-gap centers of the adjacent slot opening portions may also be formed so as to alternate between an electrical angle of α° and an electrical angle of (60−α)°, where α° is within a range of 16° to 29°, the fifth, seventh, eleventh and thirteenth magnetomotive harmonic frequencies can be reduced in a balanced manner.

Furthermore, because the pitch between the circumferential air-gap centers of the adjacent slot opening portions may also be formed so as to alternate between an electrical angle of α° and an electrical angle of (60−α)°, where α° is within a range of 22° to 24°, the fifth, seventh, eleventh and thirteenth magnetomotive harmonic frequencies can be reduced in a balanced manner.

Furthermore, because a tooth portion defining the slots of the stator core may also be provided with a flange extending in a circumferential direction from an end portion of the tooth portion, the pitch between the circumferential air-gap centers of the adjacent slot opening portions may be adjusted so as to be nonuniform by a length of extension of the flange, enabling the stator to be easily constructed.

Furthermore, because the pitch between the circumferential air-gap centers of the adjacent slot opening portions may also be formed so as to be nonuniform by means of a width of the tooth portion defining the slots of the stator core, the magnetic flux passing through the narrow tooth portions increases, promoting magnetic saturation, but in the adjacent wide tooth portions, magnetic saturation is instead moderated, enabling output to be improved.

What is claimed is:

1. An alternator comprising:
   a stator having an annular stator core provided with a number of slots extending axially and disposed in lines circumferentially so as to open on an inner circumferential side of said stator core and a stator coil wound on said stator core so as to be installed in said slots;
   a rotor having a number of claw-shaped magnetic poles for alternately forming north and south poles about a rotational circumference, said rotor being rotatably disposed on said inner circumferential side of said stator core;
   a bracket supporting said rotor and said stator; and
   a rectifier disposed at a first axial end of said stator and connected to end portions of said stator coil, said rectifier converting alternating current from said stator coil into direct current,
   wherein the number of said slots is two per phase per pole; and
   said stator coil comprises a number of winding sub-portions, each winding sub-portion formed from a long strand of wire having a length of two pole pitches or more wound so as to alternately occupy an inner layer and an outer layer of said slots in a slot depth direction within said slots at intervals of a predetermined number of slots by folding said strand of wire outside said slots at axial end surfaces of said stator core, wherein
   said stator coil is constructed by placing two three-phase coils so as to have a mutual phase difference, said three-phase coils being formed by connecting said winding sub-portions; and
   a pitch between circumferential air-gap centers of adjacent slot opening portions is formed so as to be nonuniform.

2. The alternator according to claim 1 wherein:
   a tooth portion defining said slots of said stator core is provided with a flange extending in a circumferential direction from an end portion of said tooth portion, said pitch between said circumferential air-gap centers of said adjacent slot opening portions being adjusted so as to be nonuniform by a difference in lengths of extension between flanges for adjacent slots of said stator core.

3. The alternator according to claim 1 wherein:
   said pitch between said circumferential air-gap centers of said adjacent slot opening portions is adjusted so as to be nonuniform by a difference in widths between tooth portions for adjacent slots of said stator core.

4. The alternator according to claim 1 wherein:
   said pitch between said circumferential air-gap centers of said adjacent slot opening portions is formed so as to alternate between an electrical angle of α° and an electrical angle of (60−α)°, where α° is within a range of 16° to 29°.

5. The alternator according to claim 4 wherein:
   a tooth portion defining said slots of said stator core is provided with a flange extending in a circumferential direction from an end portion of said tooth portion, said pitch between said circumferential air-gap centers of said adjacent slot opening portions being adjusted so as to be nonuniform by a difference in lengths of extension between flanges for adjacent slots of said stator core.

6. The alternator according to claim 4 wherein:
   said pitch between said circumferential air-gap centers of said adjacent slot opening portions is adjusted so as to be nonuniform by a difference in widths between tooth portions for adjacent slots of said stator core.

7. The alternator according to claim 1 wherein:
   said pitch between said circumferential air-gap centers of said adjacent slot opening portions is formed so as to alternate between an electrical angle of α° and an electrical angle of (60−α)°, where said α° is within a range of 22° to 24°.

8. The alternator according to claim 7 wherein:
   a tooth portion defining said slots of said stator core is provided with a flange extending in a circumferential direction from an end portion of said tooth portion, said pitch between said circumferential air-gap centers of said adjacent slot opening portions being adjusted so as to be nonuniform by a difference in lengths of extension between flanges for adjacent slots of said stator core.

9. The alternator according to claim 7 wherein:
   said pitch between said circumferential air-gap centers of said adjacent slot opening portions is adjusted so as to be nonuniform by a difference in widths between tooth portions for adjacent slots of said stator core.

10. The alternator according to claim 1 wherein:
    said number of winding sub-portions are constructed with at least one winding assembly formed by simultaneously bending and folding a plurality of said strand of wires,
    wherein said winding assembly is constructed by arranging at one slot pitch offset the same number of wire-strand pairs as said predetermined number of slots, each of said wire-strand pairs constructed by arranging two strands of said strands of wire so that straight portions alternately overlap at a predetermined pitch, each of said strands of wire being formed into a pattern in which said straight portions are connected by turn portions so as to be arranged at a pitch of said predetermined number of slots and adjacent straight portions are offset by said turn portions so as to alternately occupy said inner layer and said outer layer in said slot depth direction, and by extending each end portion of said strands of wire on both sides of both ends of said winding assembly and arranging the same number of pairs of said overlapping straight portions as the number of said slots at said one slot pitch.

11. An alternator comprising:

a stator having an annular stator core provided with a number of slots extending axially and disposed in lines circumferentially and a stator coil wound on said stator core so as to installed in said slots; wherein said stator coil comprises a number of winding sub-portions, each winding sub-portion formed from a long strand of wire having a length of two pole pitches or more wound so as to alternately occupy a respective inner layer and a respective outer layer of said slots in a slot depth direction within said slots at intervals of a predetermined number of slots by folding said strand of wire outside said slots at axial end surfaces of said stator core, and wherein a pitch between circumferential centers of adjacent slot opening portions of said stator core are nonuniform.

12. The alternator according to claim 11, wherein said number of winding sub-portions is four, including a first and second winding sub-portions alternately occupying a first and second layer that are the furthermost inner layer and second to furthermost inner layer of said slots in the slot depth direction, respectively, and a third and fourth winding sub-portions alternately occupying a third and fourth layer that are a third to furthermost inner layer and fourth to furthermost inner layer of said slots in the slot depth direction.

13. The alternator according to claim 12, wherein said first and second winding sub-portions define a first group of turn portions at both ends of said stator in an axial direction, and said third and fourth winding sub-portions define a second group of turn portions at both ends of said stator in the axial direction, wherein said first and second groups of turn portions form two adjacent rows.

14. The alternator according to claim 11, wherein the intervals of a predetermined number of slots is six slots.

15. The alternator according to claim 11, wherein each long strand of wire has a rectangular cross-section.

16. The alternator according to claim 11 wherein:

said number of winding sub-portions are constructed with at least one winding assembly formed by simultaneously bending and folding a plurality of said strand of wires, wherein said winding assembly is constructed by arranging at one slot pitch offset the same number of wire-strand pairs as said predetermined number of slots, each of said wire-strand pairs constructed by arranging two strands of said strands of wire so that straight portions alternately overlap at a predetermined pitch, each of said strands of wire being formed into a pattern in which said straight portions are connected by turn portions so as to be arranged at a pitch of said predetermined number of slots and adjacent straight portions are offset by said turn portions so as to alternately occupy said inner layer and said outer layer in said slot depth direction, and by extending each end portion of said strands of wire on both sides of both ends of said winding assembly and arranging the same number of pairs of said overlapping straight portions as the number of said slots at said one slot pitch.

* * * * *